Figure 1:
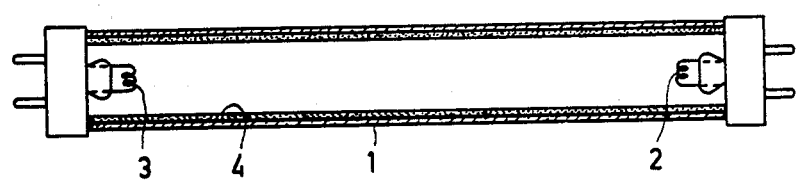

United States Patent [19]

van den Boom et al.

[11] 4,151,443
[45] Apr. 24, 1979

[54] LUMINESCENT MATERIALS AND DISCHARGE LAMP CONTAINING THE SAME

[75] Inventors: Petrus F. J. van den Boom; Antonius M. J. H. Seuter, both of Eindhoven, Netherlands

[73] Assignee: U.S. Philips Corporation, New York, N.Y.

[21] Appl. No.: 936,398

[22] Filed: Aug. 24, 1978

[30] Foreign Application Priority Data

Oct. 3, 1977 [NL] Netherlands .................. 7710776

[51] Int. Cl.$^2$ ............................................ C09K 11/46
[52] U.S. Cl. .............................. 313/486; 252/301.4 P;
252/301.4 F
[58] Field of Search .............. 252/301.4 P, 301.4 F;
313/486

[56] References Cited

U.S. PATENT DOCUMENTS

| | | | |
|---|---|---|---|
| 3,025,423 | 3/1962 | Rimbach | 252/301.4 P |
| 3,422,024 | 1/1969 | McAllister | 252/301.4 P |
| 3,525,698 | 8/1970 | Leto et al. | 252/301.4 P |
| 3,634,282 | 1/1972 | Denis et al. | 252/301.4 P |
| 3,893,939 | 7/1975 | DeKalb et al. | 252/301.4 P |
| 4,049,992 | 9/1977 | Verstegen et al. | 252/301.4 P |

FOREIGN PATENT DOCUMENTS 1263204  3/1968  Fed. Rep. of Germany .... 252/301.4 P
2534834  2/1976  Fed. Rep. of Germany .... 252/301.4 P

OTHER PUBLICATIONS

Blasse, "J. of Solid State Chemistry", 2, pp. 27–30 (1970).
Engel, "Chem. Abstracts", vol. 76, 1972, 64540c.
Westinghouse, "Chem. Abstracts", vol. 85, 1976, 27845w.

*Primary Examiner*—Jack Cooper
*Attorney, Agent, or Firm*—Norman N. Spain

[57] ABSTRACT

A luminescent material having the eulytine crystal structure and a composition defined by $Ca_{3-x-y-p}Me_xSn_pLn_{1+y-q-r}A_qSb_r(PO_4)_{3-y}(SiO_4)_y$, wherein Me is Sr and/or Ba, Ln is Y, La, Gd and/or Lu, and A is Ce and/or Tb and wherein $0 \leq x \leq 2.5$, $0 \leq y \leq 0.5$, $0 \leq P \leq 0.2$, $x+y+p \leq 2.5$, $0 \leq q \leq 1+y-r$, $0 \leq r \leq 0.5$, $p+q+r \neq 0$.

3 Claims, 2 Drawing Figures

LUMINESCENT MATERIALS AND DISCHARGE LAMP CONTAINING THE SAME

The invention relates to luminescent materials having a cubic crystal structure strongly related to that of eulytine. In addition, the invention relates to a luminescent screen comprising such a luminescent material and to a low-pressure mercury vapor discharge lamp having such a luminescent screen.

A number of known luminescent materials have an alkaline earth metal phosphate as host lattice. These phosphates may have widely varying crystal structures. The luminescent halophosphates with apatite structure are generally known. Ce and Tb-activated ortho-phosphates with the whitlockite crystal structure are described in Netherlands Patent Application 7508990. An article in J. Solid State Chem. 2. 27-30 (1970) discloses luminescent alkaline earth metal phosphates, the host lattice of which have compositions defined by the formula $M_3'M''(PO_4)_3$, $M'$ representing Sr or Ba and $M''$ one of the elements La, Nd, Gd, Bi, Y, Lu, Sc or In. These materials have a cubic crystal structure which is strongly related to that of the mineral eulytine ($Bi_4Si_3O_{12}$). It appears from this article that Ca-compounds having a eulyline crystaline structure are not formed, with the exception of $Ca_3Bi(PO_4)_3$. Mention is made of the possibility to activate these materials with different activator elements, wherein Ce and Sb result in efficient luminescent materials. Furthermore the article specifies that in the materials having compositions defined by the above-mentioned general formula, a phosphate group can be replaced by a silicate group whilst simultaneously replacing a bivalent M'-ion by a trivalent M"-ion. It appears that in this substitution the eulytine crystal structure is retained.

It is an object of the invention to provide efficient luminescent materials which can be advantageously used in, for example, discharge lamps.

The invention provides a luminescent material having the eulytine crystal structure characterized in that the material has a composition defined by the formula $Ca_{3-x-y-p}Me_xSn_pLn_{1+y-q-r}A_qSb_r(PO_4)_{3-y}(SiO_4)_y$, wherein Me represents Sr and/or Ba, Ln represents at least one of the elements Y, La, Gd and Lu, and A represents Ce and/or Tb, and where $0 \leq x \leq 2.5$ $0 \leq y \leq 0.5$ $0 \leq p \leq 0.2$ $x+y+p \leq 2.5$ $0 \leq q \leq 1+y-r$ $0 \leq r \leq 0.5$ $p+q+r \neq 0$ The luminescent materials according to the invention all have a host lattice on the base of the compound $Ca_3Ln(PO_4)_3$. Surprisingly and in contradistinction to the assumptions hitherto prevailing, it was found that these compounds with the eulytine crystal structure can be formed if during preparation a mixture of starting materials is fired at a sufficiently high temperature (1300° C. or higher) and that this compound retains its structure if the material is cooled sufficiently rapidly after preparation. This was completely unexpected as several attempts to synthetise Ca-compounds with the eulytine crystal structure were unsuccessful (with the exception of compound $Ca_3Bi(PO_4)_3$).

With a suitable activation, the $Ca_3Ln(PO_4)_3$ appears to furnish very efficient luminescent materials, these materials are, in particular, more efficient than the known Sr and Ba-compounds as will be discussed below. It appears from the above-mentioned general formula for the luminescent materials according to the invention that the Ca can be partly replaced by Sr and/or Ba. The luminescent properties remain substantially unchanged if not more than 2.5 moles Ca per formula unit are replaced ($x \leq 2.5$). Values of x exceeding 2.5 are not used because then lower luminous fluxes are obtained. Just as in the prior art phosphates, up to 0.5 $PO_4$ groups can be replaced by $SiO_4$ per formula unit whilst retaining the eulytine structure, if at the same time a similar number of Ca atoms per formula unit are replaced by Ln.

When activating a luminescent material to the invention by bivalent Sn, which replaces part of the Ca, a material is obtained which on excitation, for example by ultraviolet radiation; luminesces efficiently in a band in the blue portion of the spectrum with a maximum at approximately 450 nm and a half-width value of approximately 160 nm. Sn-contents exceeding 0.2 mole per formula unit are not used ($p \leq 0.2$) because with such high tin contents luminous fluxes which are too small are obtained owing to concentration quenching. The total quantity of Ca which can be replaced in a luminescent material according to the invention by other elements is limited to not more than 2.5 mole ($x+y+p \leq 2.5$), so that at least 0.5 mole Ca is present per formula unit of the luminescent material.

Efficient luminescent materials are also obtained if trivalent Sb is used as the activator, this trivalent Sb replacing a portion of the Ln in the lattice. The radiation emitted by these materials is substantially white and has a very wide spectral emission band (maximum at 475 nm; halfwidth value 175 nm). The Sb-content is chosen to be not more than 0.5 moles per formula unit ($r \leq 0.5$) to prevent an excessive decrease of the obtainable luminous flux owing to concentration quenching.

Materials having a strong emission in the near ultraviolet portion of the spectrum are obtained on activation by trivalent Ce, which replaces a portion of the Ln. The Ce-emission band has a maximum in the spectrum at approximately 370 nm. The Ce-activated materials are used with great advantage in lamps which are used for influencing photochemical processes.

Particularly efficient luminescent materials according to the invention are the materials activated by Ce and Tb. In these materials a transfer of the excitation energy from the Ce to the Tb takes place, which furnishes the characteristic green Tb-emission. These materials can be used in lamps for special purposes (electro-photography) but also in lamps for general illumination purposes. In the last-mentioned use a blue- and a red-luminescing material is generally used in addition to the green-luminescing material. When using Ce- and Tb-activated luminescent materials, it is possible to obtain particularly high luminescent fluxes with these lamps. The total Ce and Tb content can be so high that all the Ln is replaced ($q \leq 1+y-r$) because in this case annoying concentration quenching does not occur.

Preference is given to Ce- and Tb-activated materials having compositions defined by the formula $Ca_3Ln_{1-s-t}Ce_sTb_t(PO_4)_3$, wherein $0.5 \leq s+t \leq 1$ and $1 \leq t/s \leq 3$. The activator contents (S+t), in these materials can be relatively high. In particular, all Ln-atoms can be replaced by Ce and Tb (s+t=1). The highest luminous fluxes are obtained with such high activator contents. The ratio between the number of Tb and Ce-atoms, t/s, has a value between 1 and 3 and is preferably substantially equal to 2. With ratios $t/s \geq 2$ the energy transfer from Ce to Tb is substantially complete.

Figure 2:
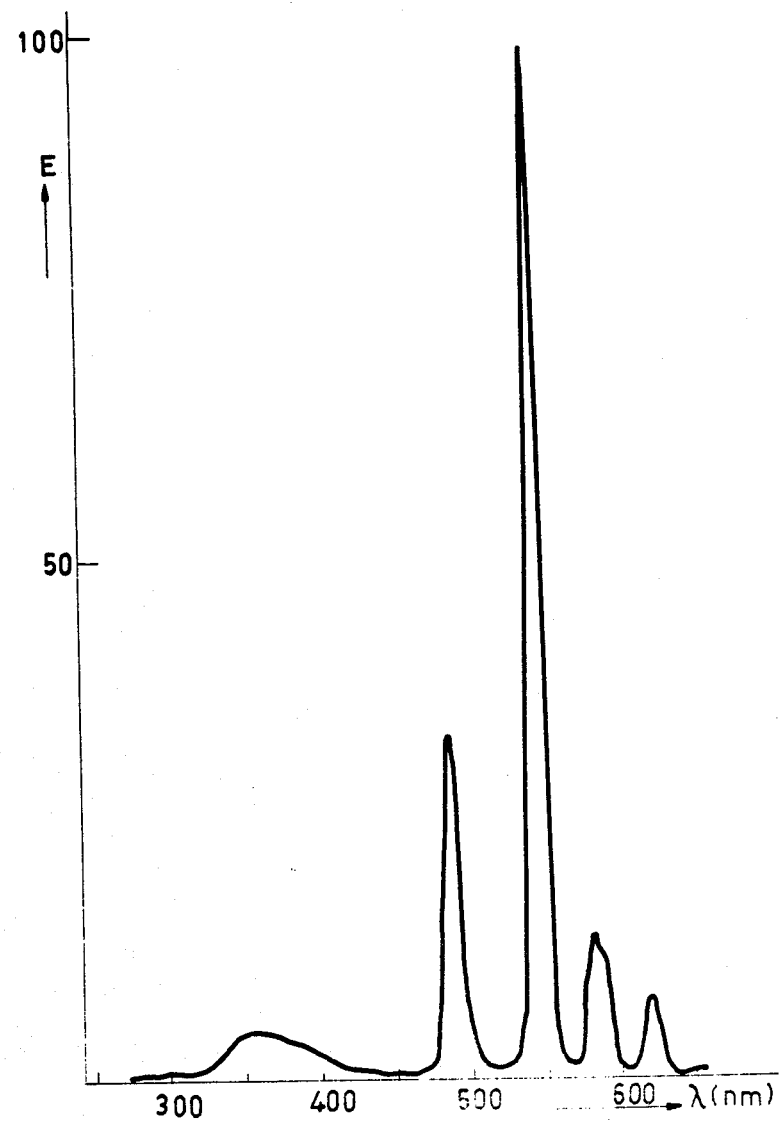

Some embodiments of the invention will now be described with reference to the following Examples and to the accompanying drawing, in which:

FIG. 1 is a diagrammatic longitudinal section of a low-pressure mercury vapor discharge lamp including a luminescent material according to the invention, and FIG. 2 shows the spectral energy distribution of the emitted radiation of a Ce- and Tb-activated alkaline earth metal phosphate according to the invention.

Reference numeral 1 in FIG. 1 is a glass discharge tube of a low-pressure mercury vapor discharge lamp. Electrodes 2 and 3 are disposed one at each end of the tube 1, and during operation of the lamp the discharge taking place between these electrodes. The discharge tube 1 contains a rare gas or a mixture of rare gases at a pressure of some torr and a small quantity of mercury. The inner side of the discharge tube 1 is coated with a luminescent layer 4 containing a luminescent material according to the invention. This layer 4 can be applied in the customary manner to the discharge tube 1, for example by means of a suspension of the luminescent material.

excitation with short-wave ultra-violet radiation (mainly 254 nm), this material appears to absorb 96.5% of the exciting radiation and to furnish a luminous flux which is 105% of the luminous flux of a standard luminescent material which is a green-luminescing aluminate having a composition defined by the formula $Ce_{0.67}Tb_{0.33}MgAl_{11}O_{19}$. This aluminate is a known, very efficient, luminescent material. The spectral distribution of the emitted radiation (on 254 nm excitation) of the phosphate obtained in the manner described above is shown in FIG. 2. In this Figure the wave-length $\lambda$ (in nm) is plotted on the horizontal axis and the emitted radiant energy E (in arbitrary units) per constant wavelength interval is plotted on the vertical axis. For reasons of comparison it should be noted that materials obtained in substantially the same manner and which have compositions defined by the formula $Sr_3Ce_{0.4}Tb_{0.6}(PO_4)_3$ and $Ba_3Ce_{0.4}Tb_{0.6}(PO_4)_3$, these two materials not being according to the invention, furnish luminous fluxes of only 92 and 68% respectively.

A number of Ce- and Tb-activated luminescent materials according to the invention were prepared in a similar manner to that described above. The formulae are given in the following Table I. Column "T" indicates the heating temperature of the starting mixture in ° C. for each firing process. The number of temperatures stated in this column indicates the number of firing operations. Each firing operation lasted 1 hour. The column "LO" states the relative luminous flux (on 254 nm excitation expressed) in percent relative to the above-mentioned standard green-luminescing aluminate.

TABLE I

| Example | Formule | T (° C.) | LO(%) |
|---|---|---|---|
| 1 | $Ca_3Ce_{0.7}Tb_{0.3}(PO_4)_3$ | 1300 | 84.5 |
| 2 | $Ca_3Ce_{0.5}Tb_{0.5}(PO_4)_3$ | 1300 | 96.5 |
| 3 | $Ca_3Ce_{0.4}Tb_{0.6}(PO_4)_3$ | 1300 | 98 |
| 4 | $Ca_3Ce_{0.3}Tb_{0.7}(PO_4)_3$ | 1300 | 99 |
| 5 | $Ca_3Ce_{0.1}Tb_{0.9}(PO_4)_3$ | 1300 | 89 |
| 6 | $Ca_3Ce_{0.4}Tb_{0.6}(PO_4)_3$ | 1250, 1300, 1100, 1300 | 105 |
| 7 | $Ca_3Ce_{0.33}Tb_{0.67}(PO_4)_3$ | 1250, 1300, 1100, 1300 | 104.5 |
| 8 | $Ca_3Y_{0.5}Ce_{0.2}Tb_{0.3}(PO_4)_3$ | 1300 | 82 |
| 9 | $Ca_3Gd_{0.5}Ce_{0.2}Tb_{0.3}(PO_4)_3$ | 1300 | 85 |
| 10 | $Ca_{2.9}Gd_{0.1}Ce_{0.4}Tb_{0.6}(PO_4)_{2.9}(SiO_4)_{0.1}$ | 1300, 1400 | 101.5 |
| 11 | $Ca_{2.8}Gd_{0.2}Ce_{0.4}Tb_{0.6}(PO_4)_{2.8}(SiO_4)_{0.2}$ | 1300, 1400 | 98 |
| 12 | $Ca_{2.5}Gd_{0.5}Ce_{0.4}Tb_{0.6}(PO_4)_{2.5}(SiO_4)_{0.5}$ | 1300, 1400 | 69 |
| 13 | $Ca_{2.5}Sr_{0.5}Ce_{0.4}Tb_{0.6}(PO_4)_3$ | 1350 | 94 |
| 14 | $Ca_2SrCe_{0.4}Tb_{0.6}(PO_4)_3$ | 1400 | 99 |
| 15 | $CaSr_2Ce_{0.33}Tb_{0.67}(PO_4)_3$ | 1400 | 98 |
| 16 | $Ca_{0.5}Sr_{2.5}Ce_{0.33}Tb_{0.67}(PO_4)_3$ | 1400 | 96.5 |
| 17 | $Ca_{2.5}Ba_{0.5}Ce_{0.4}Tb_{0.6}(PO_4)_3$ | 1400 | 99.5 |
| 18 | $Ca_2Ba\ Ce_{0.4}Tb_{0.6}(PO_4)_3$ | 1400 | 98 |
| 19 | $CaSrBaCe_{0.33}Tb_{0.67}(PO_4)_3$ | 1400 | 88 |

EXAMPLES:

A mixture is made of
7.36 g $CaHPO_4$
0.133 g $(NH_4)_2HPO_4$
1.25 g $CeO_2$
2.045 g $Tb_4O_7$.

This mixture is heated in a silica crucible for 1 hour at a temperature of 1250° C. in an atmosphere consisting of 99.75% by volume of $N_2$ and 0.25% by volume of $H_2$. After cooling and pulverizing the product obtained, it is subjected another 3 times to a temperature treatment (each time for 1 hour in the same atmosphere) at 1300, 1100 and 1300° C. respectively. The product obtained is a bright green-luminescing phosphate having a composition defined by the formula $Ca_3Ce_{0.4}Tb_{0.6}(PO_4)_3$. On The Ce- and Tb-activated phosphates according to the invention have the added advantage that they possess a very favourable temperature dependence of the luminescence. The material of Example 7 in the Table furnishes, for example, at 500° C. a luminous flux which is still more than 85% of the luminous flux at room temperature.

Phosphates, activated by Ce, by tin and by antimony were prepared in a similar manner to that described above for making the Example 6 material. The starting mixture contained $CeO_2$, SnO or $Sb_2O_3$ respectively as the activator compound. The following Table II specifies for some materials, in addition to the formula, in the column "RO" the relative radiant flux (expressed in percent relative to a luminescent calcium halophosphate activated by Sb and Mn used as a standard, the radiant flux of which is reduced, by mixing with non-luminescent $CaCO_3$, to approximately half the original value), in the column "λmax" the position of the emission maximum in the spectrum and in the ciolumn "λ½" the half-width value of the emission band in nm.

TABLE II

| Example | Formula | RO | λ max | λ ½ |
|---------|---------|-----|-------|-----|
| 20 | $Ca_3Gd_{0.4}Ce_{0.6}(PO_4)_3$ | 175.5 | 369 | 62 |
| 21 | $Ca_{2.95}Sn_{0.05}Y(PO_4)_3$ | 125.5 | 447 | 162 |
| 22 | $Ca_3Y_{0.95}Sb_{0.05}(PO_4)_3$ | 83.5 | 475 | 175 |

What is claimed is:

1. A luminescent material having the eulytine crystal structure, characterized in that the luminescent material has a composition defined by the formula $Ca_{3-x-y-p}Me_xSn_pLn_{1+y-q-r}A_qSb_r(PO_4)_{3-y}(SiO_4)_y$, wherein Me represents Sr and/or Ba, Ln at least one of the elements Y, La, Gd and Lu, and A represents Ce and/or Tb, wherein $0 \leq x \leq 2.5$
$0 \leq y \leq 0.5$
$0 \leq p \leq 0.2$
$x+y+p \leq 2.5$
$0 \leq q \leq 1+y-r$
$0 \leq r \leq 0.5$
$p+q+r \neq 0$ and wherein Sn when present being in the divalent state; Sb when present being in the trivalent state, and Ce when present being in the trivalent state.

2. A luminescent material as claimed in claim 1, wherein x, p, r and y are zero and characterized in that the luminescent material has a composition defined by the formula $Ca_3Ln_{1-s-t}Ce_sTb_t(PO_4)_3$, wherein $0.5 \leq s+t \leq 1$
$1 \leq t/s \leq 3$ 3. A low-pressure mercury vapor discharge lamp comprising a discharge tube, electrodes disposed at each end of the tube, mercury contained therein and the luminescent material of claim 1 coated on the inner side of said tube.

* * * * *